UNITED STATES PATENT OFFICE.

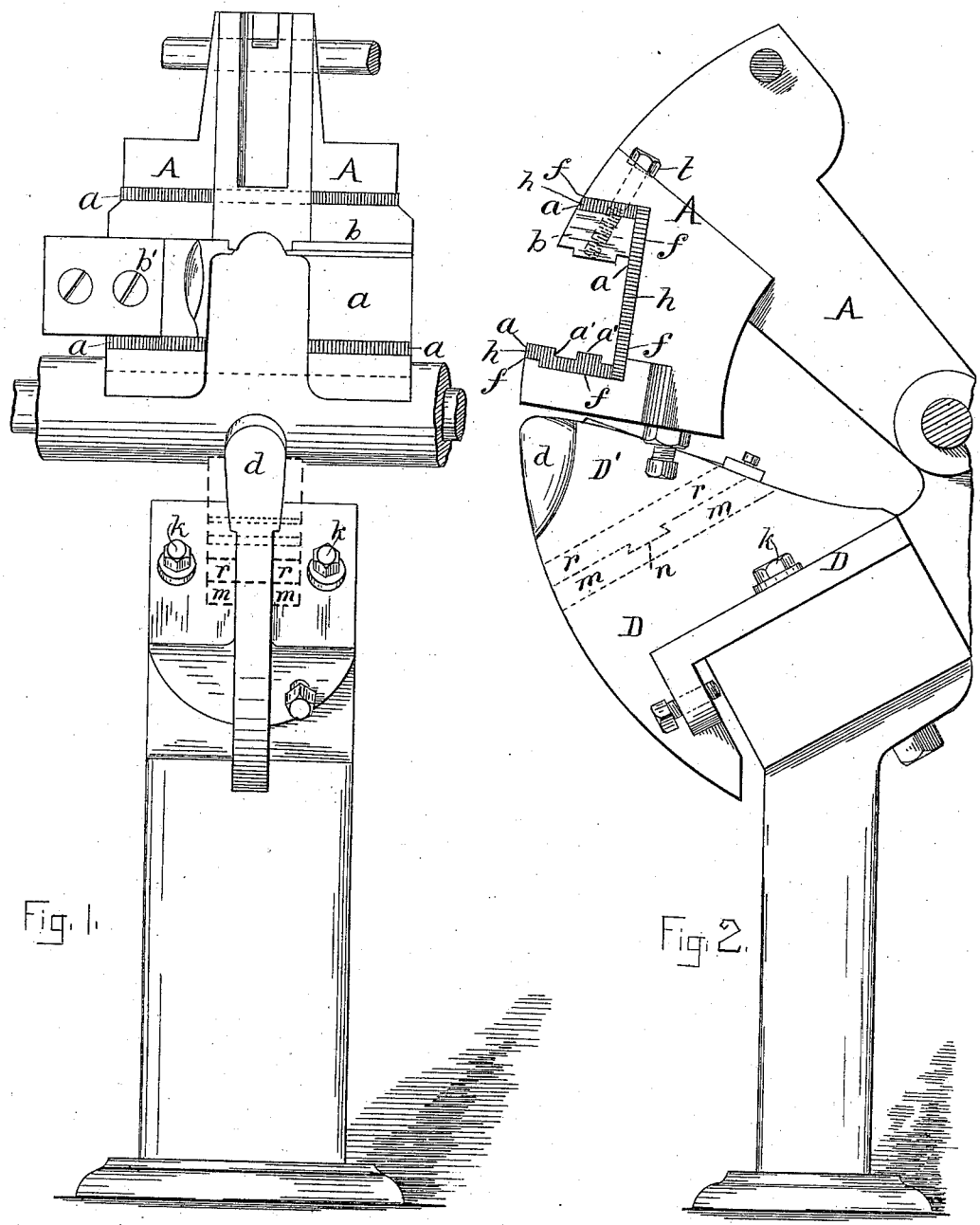

ASA HOWARD THOMPSON, OF BOSTON, MASSACHUSETTS, ASSIGNOR TO EDWIN H. SAMPSON, OF SAME PLACE.

HEEL-STIFFENER MACHINE.

SPECIFICATION forming part of Letters Patent No. 298,797, dated May 20, 1884.

Application filed March 31, 1884. (No model.)

*To all whom it may concern:*

Be it known that I, ASA HOWARD THOMPSON, of Boston, county of Suffolk, and State of Massachusetts, have invented certain new and useful Improvements in Machinery for Manufacturing Boot and Shoe Counters, of which the following is a full, clear, concise, and exact description, reference being had to the drawings accompanying and forming a part hereof.

My invention consists in an improvement of certain parts of the so-called "Moffitt Counter-Machine," which is shown and described in Letters Patent to John R. Moffitt, No. 178,869, dated June 20, 1876.

In the drawings, Figure 1 is a front view of the molds and form and part of the supporting-frame of a Moffitt counter-machine, showing my improvements. Fig. 2 is a side view of the same.

The Moffitt machine, as shown in said patent above referred to, is provided with a head, A, cut away in front, as indicated at $a$, to receive the divided three-part mold. This mold consists of a back or top piece, $b$, and two sliding side pieces or jaws, $b'$, one only of which is shown, Fig. 1, adapted to embrace the male mold $d$, between which and the female three-part mold the counter is reshaped and given a final form.

It will be obvious that in order to change the style or size of the counter produced by the machine these male and female molds must be changed and molds corresponding to the size and style required substituted. In making such substitution it will be observed that it is necessary, however small the operative faces of the mold substituted may be, that its exterior size be the same as that of the mold removed; otherwise it will not fit the cut in the head A, in which it slides. Furthermore, the lower bearing-surfaces, $a'$, on which the pieces $b'$ of the female mold slide, become worn after a relatively short period of use, and thus the movement of the pieces becomes irregular and the quality of the work produced poor.

In order to repair a machine thus worn, it has hitherto been necessary to stop the machine while the large and heavy head part A is removed, the bearing $a'$ planed down and refitted, and the head again placed in position. A change in the female mold necessitates a corresponding change in the male mold $d$, and to substitute another male mold it is necessary, in the machines as hitherto constructed, to remove the entire part marked D D', which is cast integral with the form $d$.

My improvements enable me to adapt a machine with ease and rapidity to any size or style of work, and thus to do the same amount of work and of a greater variety with a less number of machines than has been previously possible.

In constructing the head A, I cut a recess in the front thereof of uniform size in all machines, as indicated by the line $f$, Fig. 2. A case or boxing, $h$, which may be of cast-iron, is adapted exteriorly to fit the recess and interiorly to receive the parts $b$ $b'$ of the female mold. If this boxing contains a small female mold, its walls will be correspondingly thicker and the expensive metal and work of large molds saved. The wear of the parts, moreover, being wholly inside the boxing, when the parts become worn, the whole may be readily slipped out of the recess by withdrawing the securing-bolt $t$, and may be repaired at leisure, while another boxing and female mold are substituted and the machine kept running.

To facilitate change or repair of the male mold $d$, I construct its backing or support in two pieces, D D'. The lower one, D, is bolted to the frame of the machine at $k$ $k$, and is alike and permanent in all machines. The upper edge of this piece is provided with flanges $m$ $m$, fitted with a dovetail groove, $n$, Fig. 2, adapted to receive a corresponding dovetail projection on the flanges $r$ $r$ of the piece D', which carries the male mold $d$. The various sizes and styles of male molds are each provided with uniform backings D', provided with a dovetail projection of uniform size, and one can therefore be easily and speedily substituted for another.

I do not desire to limit my invention to the precise form of counter-machine shown, as the general form of the head in which the parts of the mold are set is obviously unimportant.

What I claim is—

1. The combination of the divided mold, the boxing $h$, and the recessed head A, substantially as described.

2. The combination of the recessed head A, the boxing $h$, the divided molds $b\ b'$, and the form $d$, with its backing $D'$ dovetailed to the lower support, D, all as described and shown.

ASA HOWARD THOMPSON.

Witnesses:
WM. A. MACLEOD,
ROBERT WALLACE.